United States Patent [19]

Emigh et al.

[11] 4,407,467

[45] Oct. 4, 1983

[54] TACTICAL WIRE-CUTTER SYSTEM FOR HELICOPTERS

[75] Inventors: Charles F. Emigh, Malibu; Morris Goldin, Orange, both of Calif.

[73] Assignee: Hughes Helicopters, Inc., Culver City, Calif.

[21] Appl. No.: 295,695

[22] Filed: Aug. 24, 1981

[51] Int. Cl.³ .................. B64D 7/00; B64C 27/04; F41H 13/00

[52] U.S. Cl. .................. 244/17.11; 244/121; 244/1 R; 89/1 B; 89/1 A; 114/221 A

[58] Field of Search .................. 244/17.11, 1 R, 121, 244/129.1, 137 R, 6; 89/1 A, 1 B; 258/1, 1.2, 1.4, 1.6; 114/221 A; 30/226, 228

[56] References Cited

U.S. PATENT DOCUMENTS

| 1,775,284 | 9/1930 | LaBille | 244/7 R |
| 2,335,952 | 12/1943 | Martin | 244/1 R |
| 2,386,373 | 10/1945 | Wedgworth | 89/1 A |
| 3,872,375 | 3/1975 | Ronka | 244/1 TD |
| 4,020,780 | 5/1977 | Shumaker et al. | 114/221 A |
| 4,215,833 | 8/1980 | Chan | 244/17.11 |

FOREIGN PATENT DOCUMENTS

| 38811 | 5/1928 | Denmark | 244/6 |
| 739409 | 8/1943 | Fed. Rep. of Germany | 244/1 R |

*Primary Examiner*—Sherman D. Basinger
*Assistant Examiner*—Rodney Corl
*Attorney, Agent, or Firm*—Beehler, Pavitt, Siegemund, Jagger & Martella

[57] ABSTRACT

A tactical wire-cutting system for helicopters includes a forwardly extending probe having a plurality of explosive cutting charges disposed along the probe. The probe is inclined with respect to the vertical as defined by the normal helicopter trim during flight such that a suspended cable will come into successive contact with the explosive cutting charges. The charges are designed to catch and hold the cable until detonation and thereafter to allow the cable to proceed to the next successfully positioned charge if unsevered.

10 Claims, 5 Drawing Figures

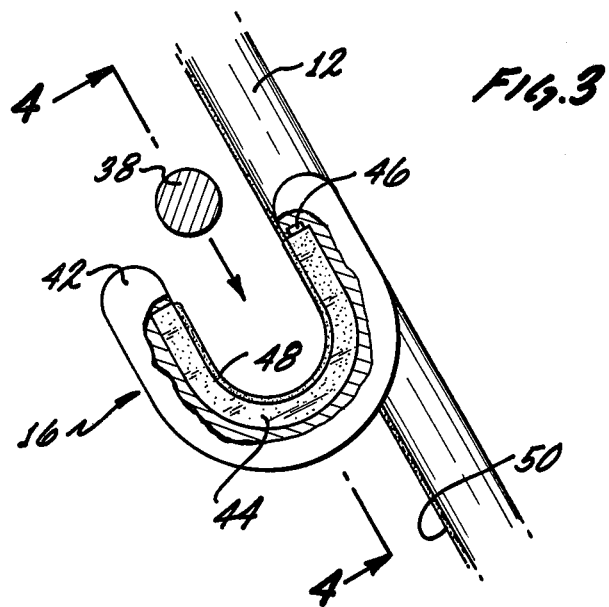
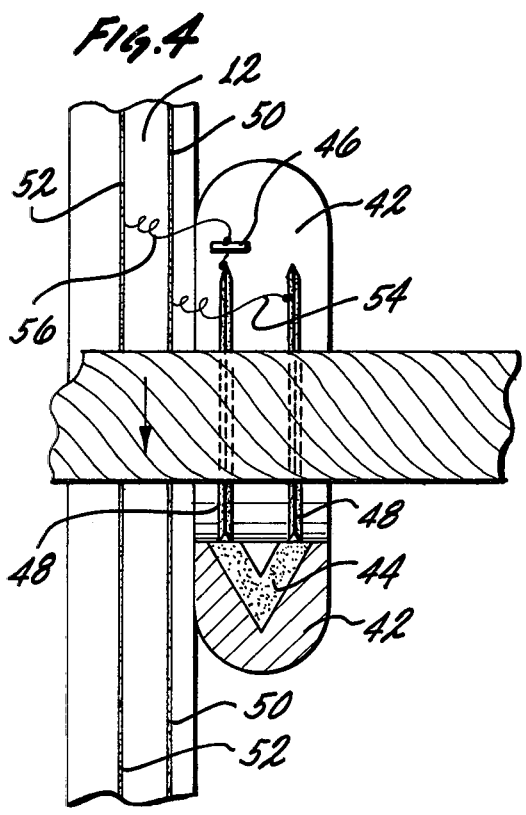
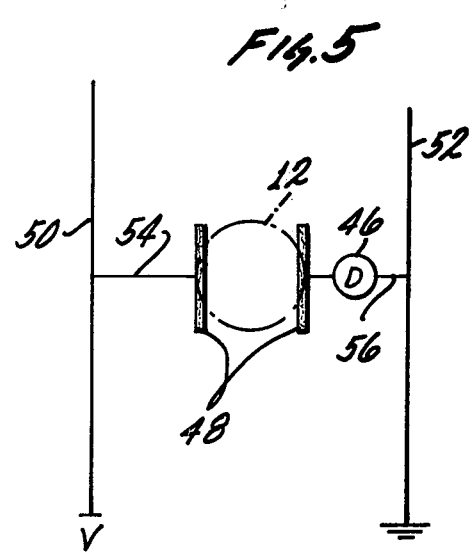

TACTICAL WIRE-CUTTER SYSTEM FOR HELICOPTERS

BACKGROUND OF THE INVENTION

1. Field of the Invention

The present invention relates to the field of airborne wire or cable-cutting devices and in particular relates to an airborne cable-cutting system particularly designed for use with helicopters.

2. Description of the Prior Art

Explosive cable-cutting devices are well known to the art and have typically been devised for use in severe environments or environments with difficult access such as submarine environments, see for example, C. Tossizza, U.S. Pat. No. 1,397,911 and R. Temple, U.S. Pat. No. 2,422,506.

The need also exists to cut cable in airborne environments. Previously, cables suspended above ground have been cut by helicopters especially equipped with rigid cable-cutters affixed to the aircraft using the cutting force supplied by a knife edge in combination with the forward motion of the aircraft, see for example, Chan, U.S. Pat. No. 4,215,833. However, the performance of knife edged mechanical cable-cutters is limited to a maximum cable size and often effectively restricted by any limitation on the maneuverability of the helicopter as well as the sharpness at which the knife edges are maintained. The success fabrication of airborne systems utilizing explosive cutters has heretofore been unsuccessful.

What is needed then is a cable cutter adapted for airborne operations which is more independent of helicopter speed and of maneuverability and which is effective with respect to a wide range of cable sizes.

BRIEF SUMMARY OF THE INVENTION

The present invention is an apparatus for cutting suspended cable for use in combination with a helicopter comprising a probe and a plurality of cutting means. The probe extends forward of the helicopter and is coupled thereto. The probe is inclined at an angle with respect to the vertical when the helicopter is in its normal horizontal trim or flight position. The plurality of cutting means are coupled to the probe and are each separately adapted for cutting the cable when the cable comes in contact with one of the cutting means. By virtue of this combination, the cable will contact the probe and slide along the probe in response to the urging of the forward motion of the helicopter thereby successively encountering the plurality of cutting means until the cable is completely severed.

In the preferred embodiment of the invention the cutting means is a plurality of explosive charges disposed along the probe. Each of the explosive charges are arranged and configured such that it is substantially destroyed by detonation in order to allow the cable, if still unsevered, to move to another one of the plurality of explosive charges.

Various embodiments of the present invention are illustrated in the following described figures where like elements are numbered by like numerals.

BRIEF DESCRIPTION OF THE DRAWINGS

FIG. 3 is a second embodiment of an explosive charge as attached to the probe illustrated in FIG. 1.

FIG. 4 is an end view cross section of the explosive cable cutter as shown in FIG. 3.

FIG. 5 is a simplified schematic showing the electrical detonation circuitry of the device of FIGS. 3 and 4.

DETAILED DESCRIPTION OF THE PREFERRED EMBODIMENTS

The present invention is a means for cutting suspended cable from an airborne position, such as construction cables, suspension cables, communication cables, power cables or the like. Although explosively powered cable cutters are well known in marine applications, the adaptation of such explosive cutters to airborne applications has heretofore proved insurmountable. The present invention combines an inclined boom or probe having a plurality of explosively powered cutters disposed along the length of the probe. The cable or wire will come into contact with successive ones of the cutters until completely severed.

Figure 1:
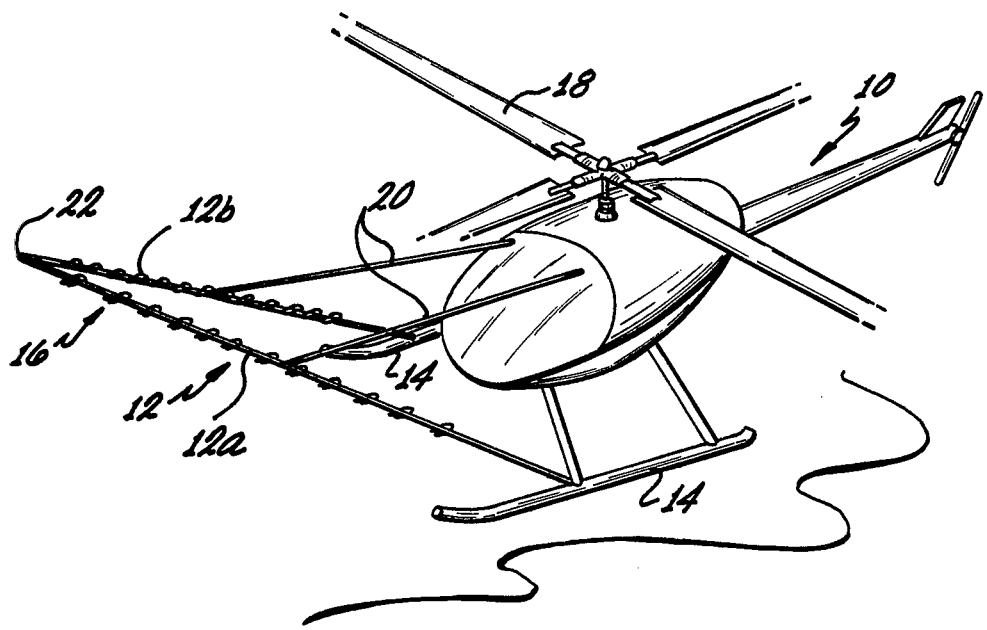
FIG. 1 shows a simplified perspective view of a helicopter equipped with a probe of the present invention.

FIG. 1 illustrates a helicopter 10 equipped with one embodiment of the present invention. Probe 12 is attached at the lower portion of helicopter 10, namely landing gear 14 and extends upwardly and forwardly of helicopter 10 forming an inclined angle with respect to the vertical when helicopter 10 is flying in its level or normal flight trim. Probe 12 has a plurality of explosive cutting means or charges 16 disposed thereon. Probe 12, when attached to helicopter, is arranged and configured such that it extends forward and above rotor disc 18 defined by the rotating blades of helicopter 10. In this manner, probe 12 protects rotor disc 18 from any interference or contact with cables which helicopter 10 may be attempting to sever. Probe 12 may be supported as necessary to preserve its inclined position with respect to helicopter 10 by wires or rigid members 20. Finally, in the illustrated embodiment, probe 12 is shown as being comprised of two sections 12a and 12b. Each end of section 12a and 12b is coupled to one of the opposing sides of landing gear 14 and extend upwardly to join at apex 22. Thus the protective shield or cutting area of probe 12 forms an inclined triangular surface. Many other configurations of probe 12 well known to the art could be devised to form other shapes of cutting areas or attachments to helicopter 10 without departing from the scope of the present invention.

Figure 2:
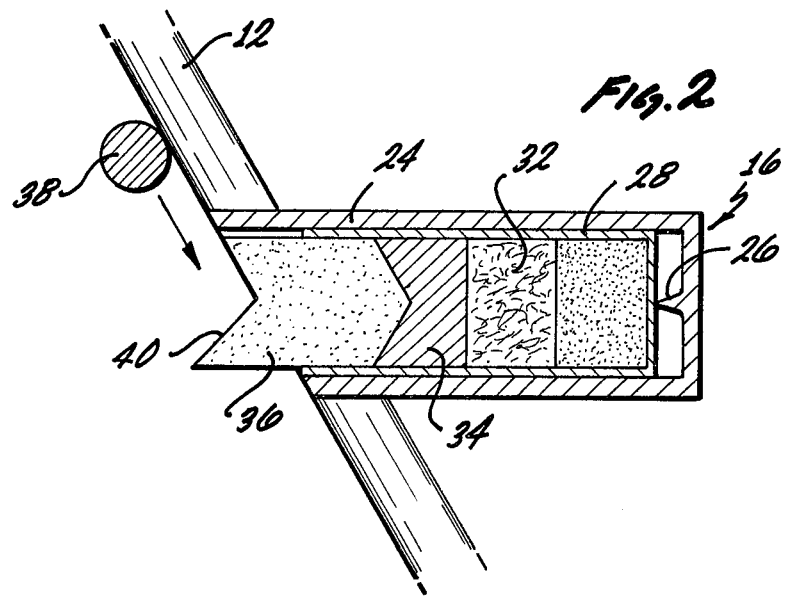
FIG. 2 is a simplified cross section of one embodiment of the explosive cutting charge attached to the probe as shown in FIG. 1.

FIG. 2 shows one embodiment of cutting means or charge 16. Cutting charge 16 is comprised of a cylindrical casing 24 which is fixed to probe 12. Casing 24 is provided at one end with a conventional firing pin 26 and is open at the opposing end. A cartridge 28 is inserted into casing 24. Cartridge 28 includes an explosive charge 30, shotgun wading 32, a cutting slug 34, and a shaped explosive nose 36.

Both slug 34 and nose 36 are provided with a special shape adapted for cutting cable 38. Slug 34 has an upper surface particularly shaped into a knife or wedge shaped edge to facilitate a cleaving penetration when impelled into cable 38. Explosive nose 36, which may be manufactured from a plastic explosive, is indented or notched in such a manner as to form a projection from casing 24 which tends to catch and secure cable 38. As cable 38 moves down probe 12, according to the urging of the forward motion of helicopter 10, it will ultimately contact the indented surface 40 of nose 36. The continued downward force exerted by cable 10 against nose 40 due to the helicopter's forward motion will cause cartridge 28 to be urged backwardly into casing 24 against firing pin 26. When sufficient pressure has been achieved, charge 34 is detonated by conventional pressure means thereby explosively propelling slug 34 into cable 38 and tending to sever the cable completely.

In the event that cable 38 is not completely severed by subjection to the explosive cutting effect of slug 34, the remaining unsevered portions of cable 38 are free to move down probe 20 in a substantially unimpeded fashion to contact the next, successively positioned cutting charge 16. Cable 38 will be completely severed by subjection to the explosive cutting action of charges 16 or will be substantially weakened and unable to withstand the forward forces exerted on it by helicopter 10, thereby causing a stress failure and severance.

FIG. 3 shows another embodiment of the present invention wherein cutting charge 16 is in the form of a hook-shaped arm 42 in which a shaped explosive charge 44 has been disposed. Arm 42 is coupled to probe 12 and hooked in an upwardly oriented direction such that the crook of hooked arm 42 catches and directs cable 38 towards shaped charge 44. Charge 44 is deeply U-shaped so that it encloses cable 38 to the maximum extent possible. In FIG. 3 charge 44 is arranged and configured to subtend cable 38 for approximately 180° of the cable's surface when cable 38 is fully nested in arm 42. Cable 38 is proximate thereto to a significant additional amount due to the deep U-shape of arm 42. Two electrical contact strips 48 are disposed along the inner surface of arm 42 or charge 44. One of the contact strips 48 is shown in FIG. 3 as overlying charge 44 and electrically coupled at one end of charge 44 to detonator 46. Detonator 46 is a conventional, electrically activated detonator. Contact strips 48 are electrically coupled to a supply line 50 and ground line 52. Power to lines 50 and 52 are provided by a central power source located in helicopter 10 or may be individually provided by a storage battery for each arm of probe 12.

FIG. 4 shows the hook shaped arm 42 of FIG. 3 as taken through cross sections 4—4 of FIG. 3. In the illustrated embodiment shaped charge 44 has a "V"-shaped cross section disposed in arm 42. According to well known principles, the "V"-shaped cross section of charge 44 will direct a maximum explosive effect toward the interior of arm 42 where cable 38 is nested. In the embodiment illustrated in FIG. 4 contact strips 48 lie directly on top of the top legs of the "V"-shaped charge 44. Contact strips 48 may also be placed in other appropriate positions within the crook of arm 42 and need not make electrical contact with shaped charge 44. Contact strips 48 are electrically coupled to detonator 46. Contact strips 48 are shown as bevelled to a knife edge to facilitate the electrical contact between strips 48 and cable 38, particularly in the case where cable 38 may be insulated or covered by a layer of oxide, paint or varnish. Should cable 38 be insulated, contact strips 48 will then cut through the insulation. At the time when both contact strips 48 electrically contact cable 38 a circuit will be completed between contact strips 48 thereby providing a detonating signal to detonators 46.

Power is provided to strips 48 from supply cable 50 by electrical coupling 54. Strips 48 are coupled with ground wire 52 by coupling 56. FIG. 5 shows in simplified form an electrical circuit used by the cutting device of FIGS. 3 and 4. Supply line 50 is coupled through electrical coupling 54 to the high voltage contact strip 48. The intervention of cable 38 is required to couple contact strips 48 thereby completing the circuit through detonator 46 and coupling 56 to ground line 52. Inadvertent grounding of either one of contact strips 48 will have no effect inasmuch as detonator 46 is coupled to the ground side. Although the present embodiment has been illustrated with respect to a single power supply which is provided in parallel to the successively disposed cutting charges spaced along probe 12, it is also included within the present invention that each cutting charge may have a separate miniaturized battery supply incorporated into arm 42 and coupled in the same manner to contact strips 48 and detonator 46 as specifically described above.

Hooked arm 42 and shaped charge 44 are arranged and configured such that the detonation of charge 44 causes the destruction of arm 42. Thusly, in the event that charge 44 is insufficient to sever cable 38, arm 42 will be eliminated allowing the partially severed cable 38 to proceed along probe 12 to the next successively positioned charge. In the embodiment illustrated in FIGS. 3 and 4 a plurality of such hooked shaped charges will be provided along probe 12 as in the preceding embodiment illustrated in FIG. 2. Although hooked shaped charge 44 is shown as horse shoe shape having a detonator 46 on one end, charge 44 may be shaped in many other ways according to principles well known to the art to cause both the destruction of cable 38 as well as detonation. Similarly, although detonation has been shown as electrically initiated by contact with cable 38, many other conventional means of detonation are also possible, including detonators triggered by pressure or physical contact with cable 38 or even by remote detonation devices located in the helicopter cockpit and operated by a pilot or other conventional detonation circuitry. In either the embodiment of FIG. 2 or 3 cutting charge 16 are substantially destroyed when detonated thereby allowing cable 38 to advance to the next successively positioned charge until completely severed.

Although the present invention has been described in combination with a helicopter in relation to two illustrated embodiments of cutting charges 16, it is entirely within the scope of the present invention that many other configurations of cutting charges 16 may be employed and that the cutting apparatus may be employed in many other environments such as on other types of aircraft or in other types of applications. Many modifications and alterations may be made to the invention by those having ordinary skill in the art without departing from the spirit and scope of the present invention.

I claim:

1. An apparatus for cutting suspended cable for use in combination with a helicopter characterized by having a rotor disc area comprising:
    a probe coupled to and extending forward of said helicopter and inclined with respect to the forward motion of said helicopter; and
    a plurality of explosive cutting means sequentially disposed along said probe for cutting said cable when in contact with any one of said plurality of explosive cutting means, each one of said plurality of cutting means having all portions projecting therefrom removed by detonation from the patch of travel of said cable along said probe after being detonated to permit continued travel of said cable to an adjacent one of said plurality of cutting means should said cable remain unsevered, whereby successive encounters between said cable and one of said cutting means is insured until said cable is severed.

2. The apparatus of claim 1 wherein said cutting means includes an explosive charge having a destructible, notched nose oriented in a generally forward direction, parallel to normal forward flight of said helicopter, said charge being urged against a firing pin when said notched nose and cable are in contact.

3. The apparatus of claim 1 wherein said cutting means includes a hook-shaped explosive charge disposed within a hook-shaped arm, said hook-shaped arm being coupled to said probe in a direction generally adapted to catch said cable, said cable being urged into said hook-shaped arm by said inclined probe by normal forward flight of said helicopter.

4. An apparatus for cutting suspended cable for use in combination with a helicopter comprising:
 a probe extending forward of a helicopter and coupled thereto, said probe being inclined at an angle when said helicopter is in normal horizontal trim; and
 a plurality of cutting means coupled to said probe for cutting said cable when in contact with any one of said cutting means, wherein said helicopter is characterized by having a rotor disc and wherein said probe extends above the rotor disc of said helicopter;
 wherein said cutting means comprises a barrel, a firing pin coupled to said barrel and an explosive charge having one end formed with an indented surface to catch on said cable and being disposed in said barrel in juxtaposition to said firing pin so that contact between said cable and charge urges said charge against said pin to detonate said charge and cut said cable,
 whereby said cable will contact said probe and slide along said probe successively encountering said plurality of cutting means until said cable is completely severed.

5. The apparatus of claim 4 wherein said cutting means and arranged and configured such that it is substantially destroyed by denotation to allow said cable, if still unsevered, to move to another one of said plurality of cutting means.

6. An apparatus for cutting suspended cable for use in combination with a helicopter comprising:
 a probe extending forward of a helicopter and coupled thereto, said probe being inclined at an angle when said helicopter is in normal horizontal trim; and
 a plurality of cutting means coupled to said probe for cutting said cable when in contact with any one of said cutting means, wherein said helicopter is characterized by having a rotor disc and wherein said probe extends above the rotor disc of said helicopter;
 wherein said cutting means includes an explosive device having an indented surface adapted to catch on said cable and wherein said device is hook shaped and oriented upwardly to catch said cable,
 whereby said cable will contact said probe and slide along said probe successively encountering said plurality of cutting means until said cable is completely severed.

7. The apparatus of claim 6 wherein said cutting means includes a hooked-shaped arm and a hook-shaped charge disposed therein, said arm having a pair of conductive rails disposed thereon and a detonator coupled to one of said rails for detonating said charge.

8. The apparatus of claim 7 wherein each said rail is provided with a knife edge for cutting through insulating layers disposed on said cable.

9. The apparatus of claim 6 wherein said cutting means includes a hooked-shaped arm and a hooked-shaped charge disposed therein, said hooked shape charge having a "V"-shaped cross section with the apex of said "V"-shaped cross section directed away from the crook of said hooked-shaped arm.

10. The apparatus of claim 6 wherein said device is arranged and configured such that it is substantially destroyed by detonation to allow said cable, if still unsevered, to move to another one of said plurality of devices.

* * * * *